United States Patent [19]

Fong et al.

[11] Patent Number: 5,539,036
[45] Date of Patent: Jul. 23, 1996

[54] FLAME RETARDED VINYL AROMATIC POLYMER COMPOSITION

[75] Inventors: Yoke K. Fong, Parkersburg, W. Va.; James E. Lamp, Newport; Ralph S. Bickle, Little Hockins, both of Ohio

[73] Assignee: General Electric Company, Pittsfield, Mass.

[21] Appl. No.: 324,834

[22] Filed: Oct. 18, 1994

[51] Int. Cl.$^6$ .................................................. C08K 5/06
[52] U.S. Cl. ........................ 524/373; 524/411; 524/412
[58] Field of Search ............................... 524/412, 411, 524/373

[56] References Cited

U.S. PATENT DOCUMENTS

| 4,107,232 | 8/1978 | Haaf et al. | |
|---|---|---|---|
| 4,579,906 | 4/1986 | Zabrocki et al. | |
| 4,639,486 | 1/1987 | Liu | |
| 5,200,454 | 4/1993 | Nakano | 524/412 |
| 5,248,718 | 9/1993 | Fasulo et al. | 524/412 |

*Primary Examiner*—Veronica P. Hoke

[57] ABSTRACT

A flame retardant thermoplastic composition is provided containing a vinyl aromatic polymer, a brominated flame retardant, and a very low level of tetrafluoroethylene polymer which had been preblended with a lubricant which is either a metal salt or ester of a fatty acid. The composition is useful for making mold parts such as business machine housings.

6 Claims, No Drawings

FLAME RETARDED VINYL AROMATIC POLYMER COMPOSITION

BACKGROUND OF THE INVENTION

1. Field of the Invention

The present invention relates to flame retarded vinyl aromatic polymer compositions, and more particularly relates to flame retarded vinyl aromatic polymer compositions containing a drip suppressant.

2. Description of the Related Art

Vinyl aromatic resins such as acrylonitrile-butadiene-styrene graft copolymers have been previously admixed with flame retardant additives and drip suppressants, see Haaf et al., U.S. Pat. No. 4,107,232, issued Aug. 15, 1978, Liu, U.S. Pat. No. 4,639,486, issued Jan. 27, 1987 and Zabrocki et al., U.S. Pat. No. 4,579,906, issued Apr. 1, 1986, all of which are incorporated herein by reference. Flame retardants have included materials such as brominated compounds, and drip suppressants have included such compounds as halogenated polyolefins such as chlorinated polyethylene and polytetrafluoroethylene. Generally compositions containing chlorinated polyethylene have required the presence of a metal stabilizer such as a tin (Sn) compound to thermally stabilize the antidrip compound. These compositions, however, have at times experienced undesirable levels of blooming of the various additives to the surface of the molded articles made therefrom, thereby resulting in substantial reductions in the gloss levels of the molded articles. In other words, utilization of such compositions to make molded parts for printer housings, computer housings or power tool housings can result in poor surface appearance. Drip suppressants have also included polytetrafluoropolymers, but effective levels in thermoplastic compositions have generally been higher than desired possibly due in part to a need for enhanced dispersion.

Accordingly, there is a need for flame retardant vinyl aromatic compositions containing a flame retardant and a drip suppressant and exhibiting low levels of blooming (exhibiting high levels of surface gloss retention) and exhibiting a desired level of flame retardancy with a minimum of drip suppressant.

SUMMARY OF THE INVENTION

The flame retardant vinyl aromatic polymer compositions contain a flame retardant and drip suppressant. The drip suppressant is a polytetrafluoroethylene polymer which is present at extremely low levels. The compositions are useful for making molded articles such as printer housings, computer housings and power tool housings, and exhibit low levels of blooming.

DETAILED DESCRIPTION OF THE INVENTION

The flame retardant thermoplastic composition contains (a) a vinyl aromatic polymer (b) a flame retardant, and (c) a very low level of a tetrafluoroethylene polymer. The resulting compositions provide molded articles which exhibit low levels of blooming upon prolonged exposure to elevated temperatures, and exhibit desired levels of fire retardancy.

The thermoplastic resin preferably is a vinyl aromatic resin, and is more preferably rubber modified monovinylidene aromatic resin comprising (a) a rubber modified monovinylidene aromatic graft copolymer and (b) an ungrafted rigid copolymer, are generally prepared by graft polymerization of a mixture of a monovinylidene aromatic monomer and one or more comonomers in the presence of one or more rubbery polymeric substrates. Depending on the amount of rubber present, a separate matrix or continuous rigid phase of ungrafted rigid (co)polymer may be simultaneously obtained along with the rubber modified monovinylidene aromatic graft polymer. The resins may also be produced by blending a rigid monovinylidene aromatic copolymer with one or more rubber modified monovinylidene aromatic graft copolymers. Typically, the rubber modified resins comprise the rubber modified graft copolymer at a level of from 5 to 100 percent by weight based on the total weight of the resin, more preferably from 10 to 95 percent by weight thereof, more preferably 20 to 90 percent by weight thereof, and most preferably from 15 to 85 percent by weight thereof; and the rubber modified resin comprises the ungrafted rigid polymer at a level of from 0 to 95 percent by weight based on the total weight of the resin, more preferably from 5 to 90 percent by weight thereof, more preferably from 10 to 80 percent by weight thereof and most preferably from 15 to 85 percent by weight thereof.

Monovinylidene aromatic monomers (vinyl aromatic monomers) which may be employed include styrene, alpha-methyl styrene, halostyrenes i.e. dibromostyrene, mono or di alkyl, alkoxy or hydroxy substitute groups on the nuclear ring of the monovinylidene aromatic monomer i.e. vinyl toluene, vinylxylene, butylstyrene, para-hydroxystyrene or methoxystyrene or mixtures thereof. The monovinylidene-aromatic monomers utilized are generically described by the following formula:

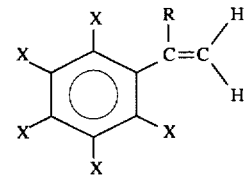

wherein X is selected from the group consisting of hydrogen, alkyl groups of 1 to 5 carbon atoms, cycloalkyl, aryl, alkaryl, aralkyl, alkoxy, aryloxy, and halogens. R is selected from the group consisting of hydrogen, alkyl groups of 1 to 5 carbon atoms and halogens such as bromine and chlorine. Examples of substituted vinylaromatic compounds include styrene, 4-methylstyrene, 3,5-diethylstyrene, 4-n-propylstyrene, α-methylstyrene, α-methyl vinyltoluene, α-chlorostyrene, α-bromostyrene, dichlorostyrene, dibromostyrene, tetrachlorostyrene, mixtures thereof and the like. The preferred monovinylidene aromatic monomers used are styrene and/or α-methylstyrene.

Comonomers which may be used with the monovinylidene aromatic monomer includes acrylonitrile, methacrylonitrile, $C_1$ to $C_8$ alkyl or aryl substituted acrylate, $C_1$ to $C_8$ alkyl, aryl or haloaryl substituted methacrylate, acrylic acid, methacrylic acid, itaconic acid, acrylamide, N-substituted acrylamide or methacrylamide, maleic anhydride, maleimide, N-alkyl, aryl or haloaryl substituted maleimide, glycidyl (meth)acrylates, hydroxy alkyl (meth)acrylates or mixtures thereof. The acrylonitrile, substituted acrylonitrile, or acrylic acid esters are described generically by the following formula:

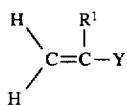

wherein $R^1$ may be selected from the same group set out for R as previously defined and Y is selected from the group consisting of cyano and carbalkoxy groups wherein the alkoxy group of the carbalkoxy contains from one or about twelve carbon atoms. Examples of such monomers include acrylonitrile, ethacrylonitrile, methacrylonitrile, α-chloroacrylonitrile, α-bromoacrylonitrile, methyl acrylate, methyl methacrylate, ethyl acrylate, butyl acrylate, propylacrylate, isopropyl acrylate and mixtures thereof. The preferred monomer is acrylonitrile and the preferred acrylic acid esters are ethyl acrylate and methyl methacrylate. It is also preferred that the acrylic acid esters, when included, are employed in combination with styrene or acrylonitrile.

The rubber modified graft copolymer comprises (i) the rubber substrate, and (ii) a rigid polymeric superstrate portion grafted to the rubber substrate. The rubber substrate is preferably present in the graft copolymer at a level of from 5 to 85 percent by weight based on the total weight of the graft copolymer, more preferably from 10 to 80 percent by weight thereof, and most preferably 20 to 70 percent by weight thereof; and the rigid superstrate is preferably present at a level of from 15 to 95 percent by weight based on the total weight of the graft copolymer, more preferably from 20 to 90 percent by weight thereof, and most preferably from 30 to 80 percent by weight thereof.

For high rubber graft emulsion resins, the rubber level will range from 50 to 85% by weight based on the total weight of the rubber modified resin. For mass polymerization, the rubber level ranges from 4 to 40% by weight based on the total weight of the rubber modified resin. For blends of an ungrafted rigid copolymer (such as styre-neacrylonitrile copolymer) with an emulsion high rubber graft (HRG) copolymer (such as acrylonitrile-butadiene-styrene graft copolymers), the rubber loading will typically range from 10 to 40% rubber based on the total weight of the rubber modified resin.

Examples of rubbery polymers for the substrate include: conjugated dienes, copolymers of a diene with styrene, acrylonitrile, methacrylonitrile or $C_1$ to $C_8$ alkyl acrylate which contain at least 50% (preferably at least 65% by weight) conjugated dienes, polyisoprene or mixtures thereof; olefin rubbers i.e. ethylene propylene copolymer (EPR) or ethylene propylene non-conjugated diene (EPDM); silicone rubbers; or $C_1$ or $C_8$ alkyl acrylate homopolymers or copolymers with butadiene and/or styrene. The acrylic polymer may also contain up to 5% of one or more polyfunctional crosslinking agents such as alkylenediol di(meth)acrylates, alkylenetriol tri(meth)acrylates, polyester di(meth)acrylates, divinylbenzene, trivinylbenzene, butadiene, isoprene and optionally graftable monomers such as, triallyl cyanurate, triallyl isocyanurate, allyl (meth)acrylate, diallyl maleate, diallyl fumarate, diallyl adipate, triallyl esters of citric acid or mixtures of these agents.

The diene rubbers may preferably be polybutadiene, polyisoprene and copolymers of butadiene with up to 35% by weight of comonomers such as styrene, acrylonitrile, methylmethacrylate or $C_1$–$C_6$-alkylacrylate which are produced by aqueous radical emulsion polymerisation. The acrylate rubbers may be cross-linked, particulate emulsion copolymers substantially of $C_1$–$C_8$-alkylacrylate, in particular C–$C_6$-alkylacrylate, optionally in admixture with up to 15% by weight of comonomers such as styrene, methylmethacrylate, butadiene, vinyl methyl ether or acrylonitrile and optionally up to 5% by weight of a polyfunctional crosslinking comonomer, e.g. divinylbenzene, glycol-bis-acrylates, bisacrylamides, phosphoric acid triallylester, citric acid triallylester, allylesters of acrylic acid or methacrylic acid, triallylcyanurate, triallylisocyanurate. Also suitable are mixtures of diene- and alkylacrylate rubbers and rubbers which have a so-called core/sheath structure, e.g. a core of diene rubber and a sheath of acrylate or vice versa.

Specific conjugated diene monomers normally utilized in preparing the rubber substrate of the graft polymer are generically described by the following formula:

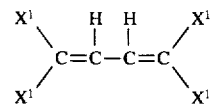

wherein $X^1$ is selected from the group consisting of hydrogen, alkyl groups containing from one to five carbon atoms, chlorine or bromine. Examples of dienes that may be used are butadiene, isoprene, 1,3-heptadiene, methyl-1,3-pentadiene, 2,3dimethylbutadiene, 2-ethyl-1,3-pentadiene 1,3- and 2,4-hexadienes, chloro and bromo substituted butadienes such as dichlorobutadiene, bromobutadiene, dibromobutadiene, mixtures thereof, and the like. A preferred conjugated diene is 1,3 butadiene.

The substrate polymer, as mentioned, is preferably a conjugated diene polymer such as polybutadiene, polyisoprene, or a copolymer, such as butadiene-styrene, butadiene-acrylonitrile, or the like. The rubbery polymeric substrate portion must exhibit a glass transition temperature (Tg) of less than about 0° C.

Mixtures of one or more rubbery polymers previously described for preparing the monovinylidene aromatic graft polymers, or mixtures of one or more rubber modified monovinylidene aromatic graft polymers disclosed herein may also be employed. Furthermore, the rubber may comprise either a block or random copolymer. The rubber particle size used in this invention as measured by simple light transmission methods or capillary hydrodynamic chromatography (CHDF) may be described as having an average particle size by weight of select one of the following: 0.05 to 1.2 microns, preferably 0.2 to 0.8 microns, for emulsion based polymerized rubber latices or 0.5 to 10 microns, preferably 0.6 to 1.5 microns, for mass polymerized rubber substrates which also have included grafted monomer occlusions. The rubber substrate is preferably a particulate, highly crosslinked diene or alkyl acrylate rubber, and preferably has a gel content greater than 70%.

Preferred graft superstrates include copolymers of styrene and acrylonitrile, copolymers of α-methylstyrene and acrylonitrile and methylmethacrylate polymers or copolymers with up to 50% by weight of $C_1$–$C_6$ alkylacrylates, acrylonitrile or styrene. Specific examples of monovinylidene aromatic graft copolymers include but are not limited to the following: acrylonitrile-butadiene-styrene (ABS), acrylonitrile-styrene-butyl acrylate (ASA), methylmethacrylate-acrylonitrile-butadiene-styrene (MABS), acrylonitrile-ethylene-propylene-non-conjugated diene-styrene (AES).

The ungrafted rigid polymers (typically free of rubber) are resinous, thermoplastic polymers of styrene, α-methylstyrene, styrenes substituted in the nucleus such as p-methylstyrene, methyl acrylate, methylmethacrylate, acrylonitrile, methacrylonitrile, maleic acid anhydride, N-substituted maleimide, vinyl acetate or mixtures thereof. Styrene/acrylonitrile copolymers, α-methylstyrene/acrylonitrile copolymers and methylmethacrylate/acrylonitrile copolymers are preferred.

The ungrafted rigid copolymers are known and may be prepared by radical polymerisation, in particular by emulsion, suspension, solution or bulk polymerisation.

The number average molecular weight of the grafted rigid superstrate of the monovinylidene aromatic resin is designed to be in the range of 20,000 to 350,000. The ratio of monovinylidene aromatic monomer to the second and optionally third monomer may range from 90/10 to 50/50 preferably 80/20 to 60/40. The third monomer may optional replace 0 to 50% of one or both of the first and second monomers.

These rubber modified monovinylidene aromatic graft polymers may be polymerized either by mass, emulsion, suspension, solution or combined processes such as bulk-suspension, emulsion-bulk, bulk-solution or other techniques well known in the art. Furthermore, these rubber modified monovinylidene aromatic graft copolymers may be produced either by continuous, semibatch or batch processes.

The usual flameproofing additives, in particular low molecular weight bromine compounds, can be used. Examples are octabromodiphenyl ethers, tetrabromophthalimide, tribromophenoxymethane, bis(tribromophenoxy)ethane, poly or oligomeric tetrabromobisphenol A, tris(tribromophenyl) triphosphate, trichlorotetrabromotoluene, hexabromocyclododecane and decabromodiphenyl ether.

The PTFE is present at a level of from 0.03 to 0.04 percent by weight, more preferably from 0.032 to 0.038 percent by weight thereof, and most preferably from 0.033 to 0.037 percent by weight thereof. The low level of PTFE is suprisingly and unexpectedly effective as a drip suppressant, and this effectiveness may be in part due to the effective dispersion achieved by preblending the PTFE with a lubricant to form a preblend prior to admixing therewith to a thermoplastic resin. The PTFE is preferably in powder or latex form.

The composition preferably also contains a synergist and a lubricant.

The flame retardant thermoplastic composition may contain various other components such as flame retardant synergists (enhancing agents) such as oxides and halides of groups IV-A and V-A of the periodic table; organic or inorganic compounds of phosphorous, nitrogen, boron or sulfur; and oxides and halides of, for example, zinc, magnesium and titanium, all as disclosed in U.S. Pat. No. 4,016,139. Preferred enhancing agents in accordance with this invention are the oxides of antimony, arsenic and bismuth, with the oxides of antimony being especially preferred. Suitable synergists include $Sb_2O_3$ (antimony trioxide), $Sb_2(CO_3)_3$, $Bi_2O_3$ and $Bi_2(CO_3)_3$, and may be present in various amounts such as 0 to 15% by weight based on the total weight of the flame retardant thermoplastic composition more preferably from 0.1 to 15%, even more preferably 2 to 10%, and most preferably 3 to 6 percent by weight thereof.

Preferably the composition is made by (a) blending the PTFE and a lubricant to form a preblend, and (b) admixing the preblend with the thermoplastic resin and flame retardant to produce the thermoplastic composition.

The lubricant is preferably selected from metal salts of fatty acids and alkyl esters of fatty acids, and more preferably is a mixture of a metal salt of a fatty acid and an alkyl ester of a fatty acid.

The following examples are meant to illustrate the present invention, but are not used to limit the scope thereof.

EXAMPLES

Example 1 illustrates the present invention, and Example A is a comparative example. All amounts are in percent by weight based on the total weight of the composition.

|  | 1 | A |
| --- | --- | --- |
| ABS | 74.30 | 69.98 |
| ATO | 2.97 | 4.20 |
| PTFE | 0.04 | — |
| CPE | — | 3.50 |
| FR | 20.80 | 19.50 |
| Burn streaking during molding, °F. | 530 | 505 |
| Melt viscosity stability @ 450° F., poise |  |  |
| 1 min dwell time | 5,212 | 6,515 |
| 5 | 5,613 | 7,216 |
| 15 | 6,114 | 8,118 |
| 30 | 6,515 | 9,321 |
| Blooming at 120° F. for 30 days, % Gloss Retention | 88 | 55 |
| Tensile strength, psi min | 5,947 | 5,223 |
| Tensile modulus, psi | 291,000 | 273,000 |
| Flexural strength, psi min | 9,629 | 8,571 |
| Flexural modulus, psi | 298,000 | 284,000 |

Bloom is tested by placing injection molded discs into individual paper bags and aging at 120° F. The degree of bloom sensitivity of the composition varies to one degree or another with the type and level of brominated flame retardant employed. The present invention is particularly useful for the bromophenoxy flame retardants such as tribromophenoxy ethane, and is particularly useful for compositions having at least 10 percent by weight brominated flame retardant, for example, 15 to 25 percent by weight brominated flame retardant based on the total weight of the resin. The brominated flame retardants preferably have a number average molecular weight of between 300 and 1000 grams per mole. ABS is an acrylonitrile-butadiene-styrene graft copolymer. ATO is antimony oxide. PTFE is polytetrafluoroethylene polymer. CPE is chlorinated polyethylene. FR is a brominated flame retardant. The compositions (1, A) also contained small amounts of lubricants.

The tetrafluoroethylene polymer powders are preferably in a number average particle size range of from 100 microns to 500 microns, and the tetrafluoroethylene polymer latex preferably has a number average particle size range of from 0.2 to 1 micron.

We claim:

1. A flame retardant thermoplastic composition consisting essentially of:

(a) a vinyl aromatic polymer consisting essentially of a rubber modified monovinylidene aromatic graft copolymer and an ungrafted rigid polymer, said ungrafted rigid polymer being present at a level from 15 to 85 percent by weight based on the total weight of the composition, (b) a brominated flame retardant present at a level from 15 to 25 percent by weight based on the total weight of the composition, and (c) a tetrafluoroethylene polymer present at a level of from 0.03 to 0.04 percent by weight based on the total weight of the composition, said tetrafluoroethylene being added as a preblend consisting essentially of said tetrafluoroethylene and a lubricant, said a lubricant being selected from the group consisting of metal salts of fatty acids and alkyl esters of fatty acids, and (d) an oxide of antimony being present at a level from 3 to 6 percent by weight based on the total weight of the composition, said composition being substantially entirely free of tin and chlorinated olefin polymers.

2. The composition of claim 1 wherein said flame retardant is a bromophenoxy compound.

3. The composition of claim 2 wherein said flame retardant is bis(tribromophenoxy)ethane.

4. The composition of claim 1 wherein said vinyl aromatic polymer is a vinyl cyanide-diene-vinyl aromatic graft copolymer.

5. The composition of claim 1 wherein said vinyl aromatic resin is present at a level of from 70 to 80 percent by weight based on the total weight of the composition.

6. A business machine housing molded from the composition of claim 1.

* * * * *